(12) United States Patent
Underwood et al.

(10) Patent No.: US 7,319,921 B2
(45) Date of Patent: Jan. 15, 2008

(54) WATER TREATMENT CONTROL SYSTEM

(76) Inventors: Fred R. Underwood, 6 Coventry Ct., Dallas, TX (US) 75230; Charles Hicks, 11711 High Forest, Dallas, TX (US) 75230

( * ) Notice: Subject to any disclaimer, the term of this patent is extended or adjusted under 35 U.S.C. 154(b) by 142 days.

(21) Appl. No.: 10/153,149

(22) Filed: May 22, 2002

(65) Prior Publication Data

US 2003/0220717 A1    Nov. 27, 2003

(51) Int. Cl.
*G06F 19/00* (2006.01)

(52) U.S. Cl. .................................... 700/282

(58) Field of Classification Search ............... 700/271, 700/275, 281–285; 210/141–143; 251/12, 251/129.01, 129.04, 129.06, 205
See application file for complete search history.

(56) References Cited

U.S. PATENT DOCUMENTS

| | | | |
|---|---|---|---|
| 4,568,465 A | | 2/1986 | Davis et al. |
| 5,038,318 A | | 8/1991 | Roseman |
| 5,351,199 A | * | 9/1994 | Ticcioni et al. ............. 700/282 |
| 5,828,851 A | * | 10/1998 | Nixon et al. ................. 710/105 |
| 5,841,654 A | | 11/1998 | Verissimo et al. |
| 5,896,290 A | | 4/1999 | Katsuta et al. |
| 5,940,294 A | | 8/1999 | Dove |
| 5,947,689 A | | 9/1999 | Schick |
| 5,955,859 A | | 9/1999 | Baurand et al. |
| 5,978,193 A | | 11/1999 | Kaaden |
| 5,995,916 A | | 11/1999 | Nixon et al. |
| 6,026,352 A | * | 2/2000 | Burns et al. ................. 702/182 |
| 6,035,240 A | | 3/2000 | Moorehead et al. |
| 6,047,222 A | * | 4/2000 | Burns et al. ................... 700/79 |
| 6,067,477 A | | 5/2000 | Wewalaarachchi et al. |
| 6,115,713 A | * | 9/2000 | Pascucci et al. .............. 707/10 |
| 6,127,748 A | | 10/2000 | Girard et al. |
| 6,173,731 B1 | | 1/2001 | Ottliczky |
| 6,206,042 B1 | * | 3/2001 | Channell et al. .......... 137/624.2 |
| 6,210,580 B1 | | 4/2001 | Wickins |

(Continued)

FOREIGN PATENT DOCUMENTS

DE        19502499 A  *  8/1996

(Continued)

OTHER PUBLICATIONS

Werner R. Kriesel, Otto W. Madelung, *AS-Interface The Actuator-Sensor-Interface for Automation*, (1999) Carl Hanser Verlag Munchen Wien, Germany.

*Primary Examiner*—M. N. Von Buhr
(74) *Attorney, Agent, or Firm*—Akin Gump Strauss Hauer & Feld LLP; Dwayne L. Mason; Tara M. Williams

(57) ABSTRACT

A water filter system comprising a control system, communication means, piping, actuators, sensors and valves. The control system utilizes a communication bus for controlling and monitoring water flow through the piping via control of the actuators and valves. The communication bus comprises a two-wire network in a loop configuration coupling the various actuators and valves to the control system. The control system includes a display and programmable control logic for monitoring and controlling the actuators and valves. In one embodiment, the communication bus adheres to a Actuator Sensor-Interface (AS-I) standard. The control system is further coupled to other control systems in a water treatment plant and a Supervisory Control and Data Acquisition (SCADA) network.

52 Claims, 6 Drawing Sheets

U.S. PATENT DOCUMENTS

| | | |
|---|---|---|
| 6,222,441 B1 | 4/2001 | Siegwarth |
| 6,235,200 B1 | 5/2001 | Mace |
| 6,285,912 B1 | 9/2001 | Ellison et al. |
| 6,285,966 B1 | 9/2001 | Brown et al. |
| 6,289,787 B1 | 9/2001 | Underwood et al. |
| 6,294,889 B1 | 9/2001 | Briant et al. |
| 6,304,934 B1 * | 10/2001 | Pimenta et al. ............. 710/305 |
| 6,332,327 B1 | 12/2001 | Street et al. |
| 6,378,574 B2 | 4/2002 | Tsutsui |
| 6,449,715 B1 * | 9/2002 | Krivoshein ................... 713/1 |
| 6,458,268 B1 * | 10/2002 | Grandprey et al. ........ 210/96.1 |
| 6,564,242 B1 * | 5/2003 | Bonet et al. ................ 709/201 |
| 6,569,335 B1 * | 5/2003 | Johnson ..................... 210/614 |
| 6,601,005 B1 * | 7/2003 | Eryurek et al. ............. 702/104 |
| 6,647,315 B1 * | 11/2003 | Sherriff et al. .............. 700/204 |
| 6,687,698 B1 * | 2/2004 | Nixon et al. ................. 707/10 |
| 6,691,604 B1 * | 2/2004 | Hajek et al. ................. 91/436 |
| 6,701,225 B1 * | 3/2004 | Schenk et al. ................ 701/1 |
| 6,704,737 B1 * | 3/2004 | Nixon et al. ................ 707/101 |
| 2002/0087244 A1 * | 7/2002 | Dix et al. ..................... 701/50 |
| 2003/0018590 A1 * | 1/2003 | Bar ............................ 705/413 |
| 2003/0019297 A1 * | 1/2003 | Fiebelkorn et al. ........... 73/587 |
| 2003/0030537 A1 * | 2/2003 | Kogure ....................... 340/3.5 |
| 2003/0083756 A1 * | 5/2003 | Hsiung et al. ................ 700/28 |
| 2003/0109951 A1 * | 6/2003 | Hsiung et al. .............. 700/108 |
| 2003/0144746 A1 * | 7/2003 | Hsiung et al. ................ 700/28 |
| 2004/0153594 A1 * | 8/2004 | Rotvold et al. ............. 710/305 |
| 2005/0007249 A1 * | 1/2005 | Eryurek et al. ............. 340/511 |
| 2005/0010307 A1 * | 1/2005 | Dove et al. ................... 700/18 |
| 2005/0012608 A1 * | 1/2005 | Havekost et al. ........... 340/517 |
| 2005/0033466 A1 * | 2/2005 | Eryurek et al. ............. 700/108 |

FOREIGN PATENT DOCUMENTS

| | | |
|---|---|---|
| DE | 19734694 A1 * | 3/1999 |
| DE | 19814102 A * | 11/2002 |
| EP | 1312991 A * | 5/2003 |

* cited by examiner

WATER TREATMENT CONTROL SYSTEM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention pertains to water treatment systems, and particularly to a control and communication system for controlling and monitoring components within a water filter system.

2. Description of the Related Art

Surface water such as lake or river water, or subterranean water, is generally treated in a water treatment plant for use as potable or drinkable water. This pre-treated water often contains materials that can cause a bad taste or odor, or is otherwise harmful. For example, the water may contain organic substances from decaying vegetation, or chemicals from various agricultural or industrial applications, such as pesticides and herbicides.

Water treatment plants include a water treatment system consisting of filter beds, pipes, fittings and various actuators, sensors and valves to control the flow of water through the treatment system. Prior art systems include a control system with various discrete control and status lines to various actuators, sensors and valves. Typical prior art water treatment systems may include hundreds of discrete control lines snaking their way in a water treatment plant between the control system and the actuators, sensors and valves. Besides the physical space taken by the discrete control lines, maintainability, testability and reliability of the system may be hampered as a result of the hundreds of lines.

BRIEF SUMMARY OF THE INVENTION

A water treatment system including water filters, a control system, a communications bus, piping, fittings and various devices including actuators (e.g., a vane type actuator, manufactured by K-Tork International, Inc. of Dallas, Tex.), sensors and valves is disclosed. Generally, the flow of water through the system is controlled by various pipes and valves. The valves can be opened and closed either manually (i.e., human intervention) or through an actuator. The control system controls the flow of water through the system by opening and closing the valves via the actuators. A communication bus couples the control system to the various devices of the system.

In one embodiment, the communication bus adheres to the Actuator Sensor-Interface (AS-I) standard. The standard includes a two (2) wire cable configured in a loop configuration. This configuration provides additional reliability to the system should the loop experience a fault somewhere in the line. The cable carries data and power to the various devices.

In one embodiment, the control system comprises a menu driven step-by-step methodology which facilitates the control including regeneration of the filter system by operators with little or no prior training. The control system includes various man-machine and electrical interfaces and programmable logic control for transmitting/receiving control and status data over the communication bus. The man-machine interface allows users to monitor various parameters of the water treatment system through a display and enter commands via a keypad or dedicated computer system. In addition, the control system can control the devices either automatically or through manual human intervention. The control system can be linked to other control systems, including a Supervisory Control and Data Acquisition (SCADA) system or filter panel for the control and monitoring of various devices in a water treatment plant. The link could be based on any communication network standard, but preferably the link is based on Institute of Electrical and Electronic Engineer (IEEE) standard 802.3 (Ethernet).

DETAILED DESCRIPTION OF THE INVENTION

Figure 1:
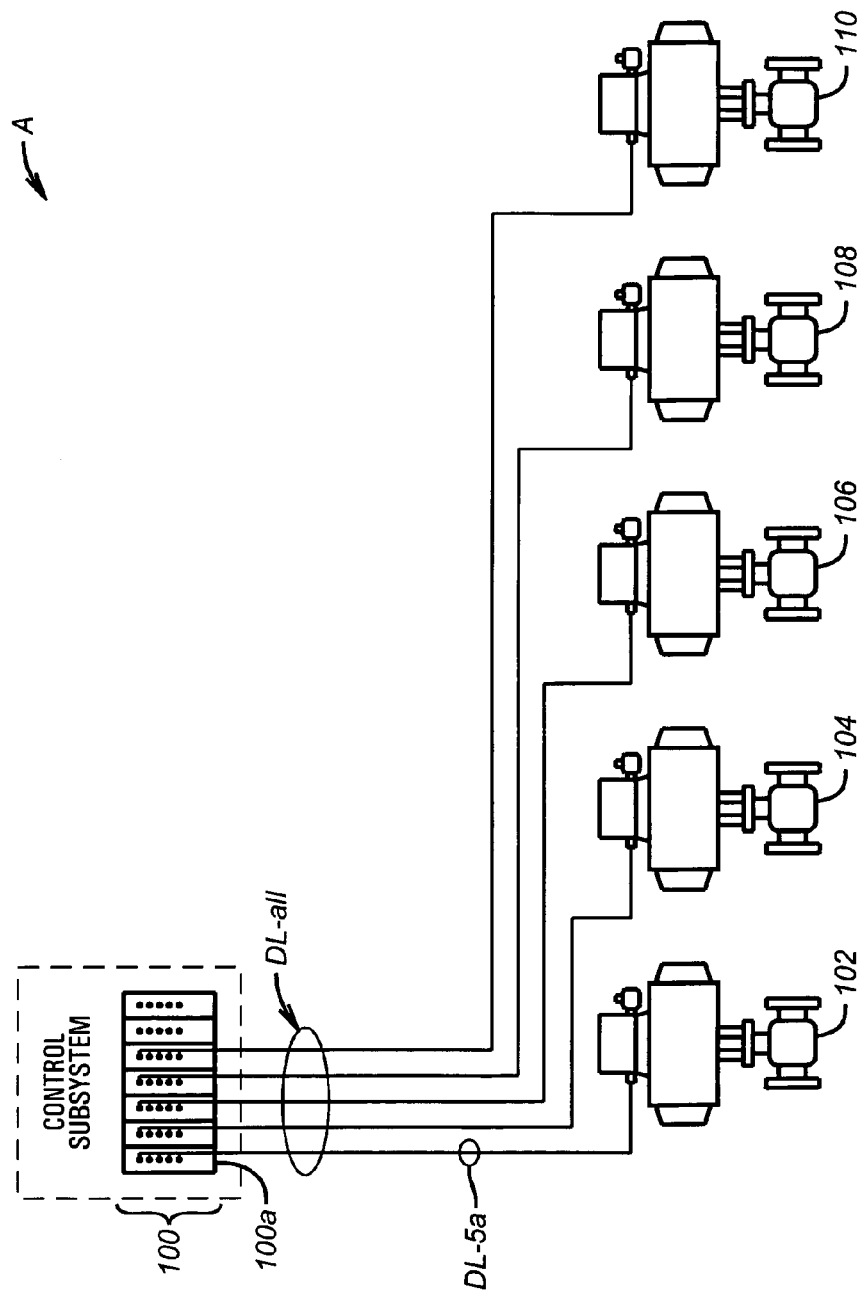
FIG. 1 is a block diagram of a prior art valve system including a control system and a plurality of valves.

FIG. 1 shows a prior art automated valve system. The system A consists of a control subsystem interface 100 for a control subsystem (not shown), discrete control lines DL-all and combination valve-actuator-solenoid units 102, 104, 106, 108 and 110. The figure illustrates twenty-five (25) discrete control lines DL-all coupled to the control subsystem interface 100. The discrete control lines DL-all are capable of carrying both power and control signals. The discrete control lines DL-all are coupled to the various valve-actuator-solenoid units 102, 104, 106, 108 and 110 in bundles of five (5) discrete control lines DL-5. The bundles of five (5) discrete control lines DL-5 are wired to a particular interface card in the control subsystem interface 100. The control subsystem generally provides a man-machine interface (not shown) for allowing users to manually operate the valves within the system.

For example, the discrete control lines DL-5A are coupled to the interface card 100a and the valve-actuator-solenoid 102. The interface card 100a provides power and control signals to the valve-actuator-solenoid 102. The control signals could include signals to change the states of the valve 102, from an open state to a closed state and vice versa.

Power can also be carried over the discrete control lines DL all from the control interface subsystem 100 to the valves 102, 104, 106, 108 and 110. The power can be used by the valves to energize/de-energize its solenoid for opening and closing the valves and for powering electronics, if any, within the valves.

For instance, a user may desire to close valve 102. The user would initiate an action (perhaps the pushing of a button to close a circuit) from the control subsystem to change the state of valve 102 from open to close. The control subsystem would direct the control subsystem interface to supply the necessary power to the solenoid of the valve 102 to close said valve.

The above description of the prior art automated valve system demonstrates the shortcomings of discrete control lines system. Although FIG. 1 shows five (5) valves and twenty-five (25) discrete control lines, typical applications of such systems can utilize tens of valves and hundreds of discrete control line over distances of hundreds of meters. Maintainability, reliability and testability of the system may be difficult due the number of wires over a particular distance.

Figure 2:
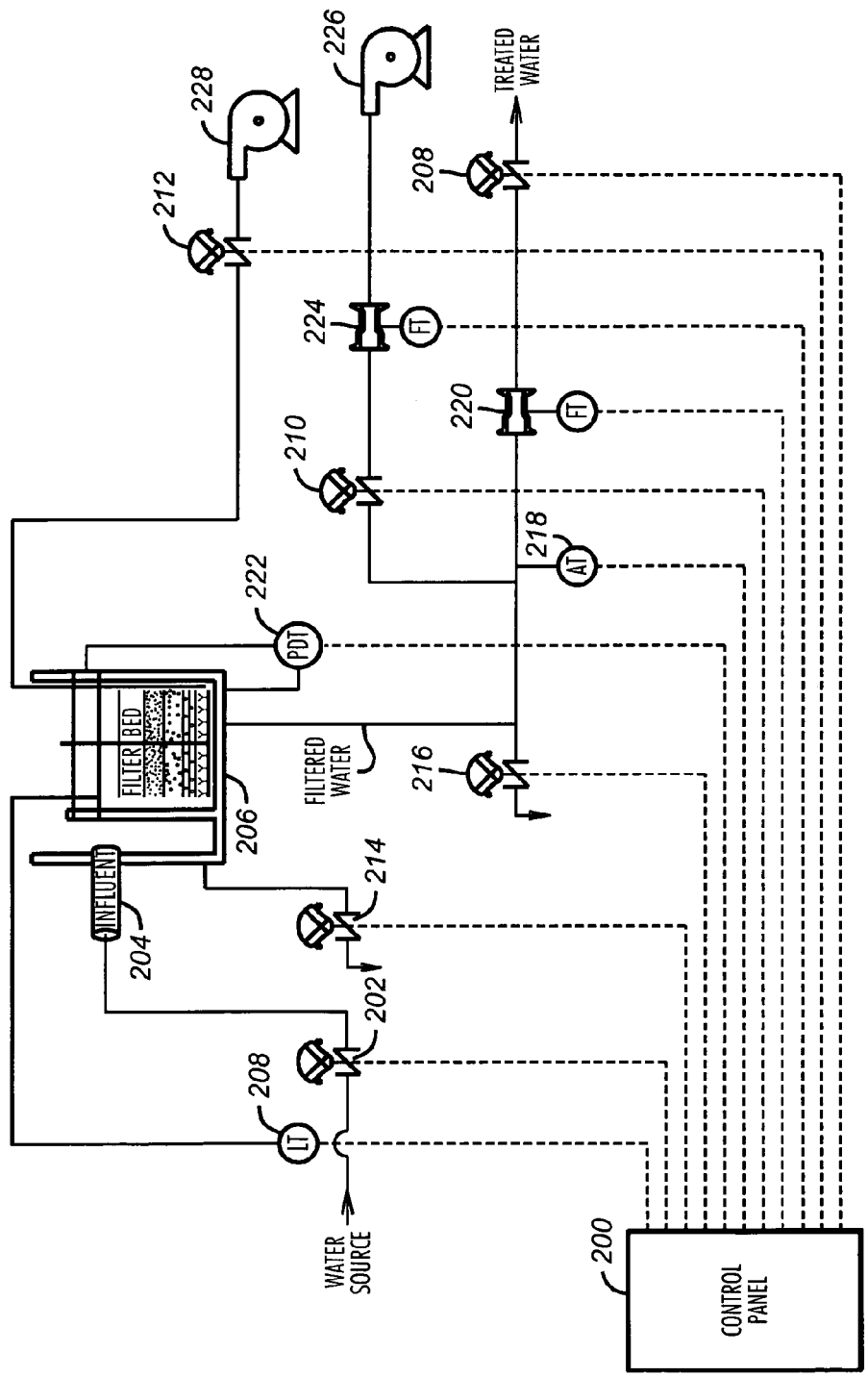
FIG. 2 is a block diagram of a prior art water filter system using the valve system of FIG. 1.

FIG. 2 illustrates a prior art water treatment system with discrete control lines. The process for treating water includes pre-treated water from a source WATER SOURCE first flowing through an influent valve 202 prior to entry into a filter bed 206. The source WATER SOURCE typically comprises a reservoir, lake, river, or other source of unfiltered water. The filter bed 206 can include various media to eliminate certain undesirable elements from the pre-treated water. For instance, the filter bed 206 may utilize a granulated activated carbon bed as an adsorption unit for removing undesirable elements from the pre-treated water. The influent valve 202 controls the flow of water from the WATER SOURCE to the filter bed 206. The level of water in the filter bed 206 can be ascertained by a level sensor 208. The method for ascertaining the water level can be made by various methods known in the art, such as a liquid detector or a sonic sensor.

If the FILTERED water from the filter bed 206 is determined to be acceptable (method for determining acceptability will be discussed below), a DRAIN valve 214, a FILTER TO WASTE valve 216 and a BACKWASH valve 210, a AIRWASH valve 212, are all closed to allow the FILTERED water to exit the system via an opened EFFLUENT valve 208.

A turbidmeter 218 is used to determine the turbidity of the FILTERED WATER. Turbidity is one parameter used to determine the quality of water. The quality of potable or drinking water is generally determined by federal, state or community authorities. In addition, a HEAD LOSS device 222 may provide some indication on whether the filter bed 206 needs to undergo a backwash process. Consequently, whether the filtered water is acceptable or not is typically ascertained by the turbidity of the FILTERED water and head loss.

Should the turbidity of the filtered water or the pressure differential indicated on the head loss device reach unacceptable levels, more than likely, the filter bed 206 is no longer capable of removing the undesirable elements from the pre-treated water. Thus, the filter bed 206 is cleaned by a backwash system including the BACKWASH valve 210 and a pump 220.

During a backwash cycle, the INFLUENT valve 202, the EFFLUENT valve 208, the AIRWASH valve 212, and the FILTER TO WASTE valve 216 are all closed. First, the water level in the filter bed 206 is reduced by opening the DRAIN valve 214. After the water level is dropped to a certain level (as detected by the level sensor 208), the DRAIN valve 216 is closed and the AIRWASH valve 212 is opened. The flow of air generated by the blower 228 initially loosens any undesirable particulate from the media.

The AIRWASH valve 212 is closed, the BACKWASH valve 210 is opened and a pump 226 pumps the FILTERED water back into the filter bed 206. The amount of FILTERED water pumped by the pump 220 may vary in time, so as to create a backwash effect in the filter bed 206 to remove the undesirable elements from the media. Once the backwash process is completed, the BACKWASH valve 210 is closed and the FILTER TO WASTE valve 216 is opened to allow the backwash water to exit the system. The FILTER TO WASTE valve 216 is then closed and the INFLUENT valve 202 is opened to allow water from the WATER SOURCE to enter into the filter system.

All of the valves, pumps and sensors (cumulatively, the "devices") can be controlled or monitored by a control panel 200. The devices are coupled to the control panel 200 via discrete control lines (represented in the figure by dashed lines) in a linear configuration topology. The control panel 200 can provide the appropriate signal to change the state (open or close) of a valve via the discrete control lines. The control panel 200 can also typically receive information from a device, such as the level sensor 208, the turbidmeter 218 and various flowmeters 220 and 224. Thus, the operator (not shown) of the control panel 200 can monitor the turbidity of the FILTERED water or pressure differential from the HEAD LOSS device 222 and can initiate a backwash process should the turbidity or pressure differential of the FILTERED water reach an unacceptable level.

The number of wires in a discrete control line to a particular device may vary. For example, the discrete control lines from the control panel 200 to the INFLUENT valve 202 may require five (5) separate wires, over a distance of one-hundred (100) meters. Therefore, it is possible that the number of wires from the control panel 200 may exceed a hundred (100) or more wires.

Figure 3:
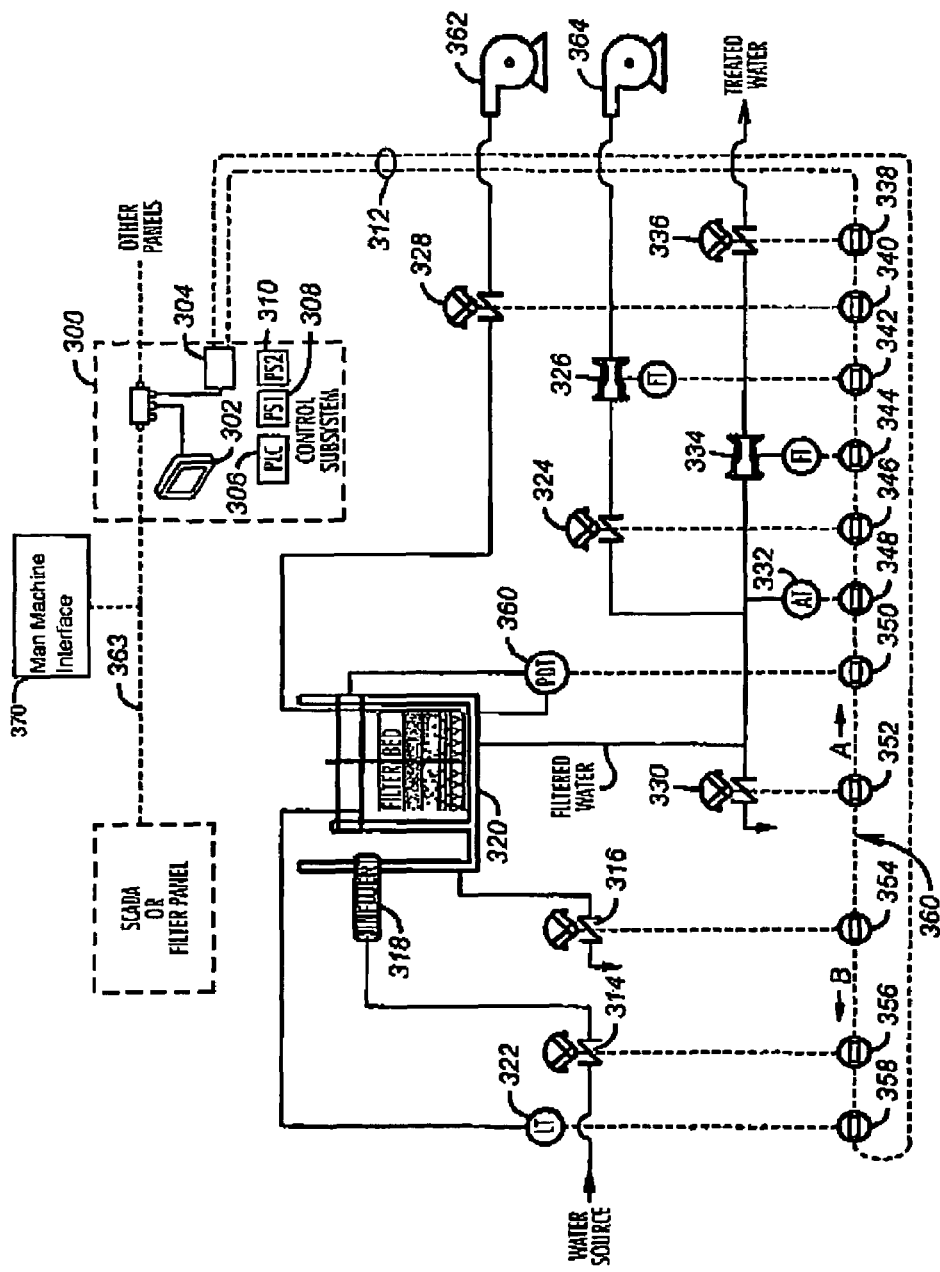
FIG. 3 is a block diagram of a water treatment system according to the present invention.

FIG. 3 is a block diagram of a water filter system according to the present invention. Each step shown in FIGS. 3-5 and described herein below is displayable on the control panel 200 and controllable by an operator via the control panel. In one embodiment, each step in the control of the water filter is displayed for an operator to initiate manual or automatic control of the filter system. The flow of water through the water filter system is controlled by valves and piping. The process for treating water includes pre-treated water from a source WATER SOURCE first flowing through an influent valve 314 prior to entry into a filter bed 320. The filter bed 320 can include various media to eliminate certain undesirable elements from the pre-treated water. For instance, the filter bed 320 may utilize a granulated activated carbon bed media as an adsorption unit for removing undesirable elements from the pre-treated water.

The influent valve 314 controls the flow of water from the WATER SOURCE to the filter bed 320. It is noted that the valves described herein may include an actuator for opening or closing the valve. The actuator may be a vane-type actuator, such as one manufactured by K-Tork International, Inc. of Dallas, Tex. and disclosed in U.S. Pat. No. 6,289,787, said patent incorporated by reference in its entirety. The level of water in the filter bed 320 can be ascertained by a level sensor 322. The sensor 322 may utilize various known methods for ascertaining the water level, such as a liquid detector or a sonic sensor.

If the FILTERED water from the filter bed 320 is determined to be acceptable, a DRAIN valve 316, a FILTER TO WASTE valve 330, an AIRWASH valve 328 and a BACKWASH valve 324 are all closed to allow the FILTERED water to exit the system via an opened EFFLUENT valve 336.

Various sensors can ascertain various operating parameters of the water treatment system. For example, the state of a valve may be ascertained by a sensor monitoring an actuator coupled to a valve. In addition, FIG. 3 illustrates a turbidmeter 332 used to determine the turbidity of the FILTERED WATER and a HEAD LOSS device 360 used to measure a pressure differential in the FILTERED water. Thus whether the filtered water is deemed acceptable or not is typically ascertained by the turbidity and pressure differential of the FILTERED water.

Should the turbidity or pressure differential of the filtered water reach unacceptable levels, more than likely, the filter bed 320 is no longer capable of removing the undesirable elements from the pre-treated water. Thus, the filter bed 320 is cleaned by a backwash system including the AIRWASH valve 328, a AIRWASH blower 362, the BACKWASH valve 324 and a BACKWASH pump 364.

During an initial backwash cycle, the level of the water is lowed by closing the INFLUENT valve 314, the EFFLUENT valve 336, the BACKWASH valve 324, the AIRWASH valve 328 and the FILTER TO WASTE valve 330 and opening the DRAIN valve 316. The level drop can be detected by the level sensor 322. Once the level of water in the filter bed 320 reaches an acceptable level, the INFLUENT valve 314, the EFFLUENT valve 336, the DRAIN valve 316, the BACKWASH valve 324 and the FILTER TO WASTE valve 330 remain closed. The AIRWASH valve 328 is opened and the blower 362 is turned on. The blower 362 generates a flow to loosen particulates from the media of the filter bed 320.

Next, the AIRWASH valve 328 is closed, the BACKWASH valve 324 is opened and the pump 364 pumps the FILTERED water back into the filter bed 320. The amount of FILTERED water pumped by the pump 326 may vary in time, so as to create a backwash effect in the filter bed 320 to remove the undesirable elements from the media. Once the backwash process is completed, the FILTER TO WASTE valve 330 is opened to allow the backwash water to exit the system. The FILTER TO WASTE valve 330 is then closed and the INFLUENT valve 314 is opened to allow water from the WATER SOURCE to enter into the filter system and the EFFLUENT valve 336 is opened to allow the filtered water to exit from the filter system.

All of the valves, pumps and sensors (cumulatively, the "devices") can be controlled or monitored by a control subsystem 300. The devices are generally coupled to the control panel 300 via a bus 312.

In one embodiment, communication and control of the control subsystem 300 and the devices adhere to the Actuator Sensor-Interface (AS-I) standard. The specification of the AS-I standard is described in Werner R. Kriesel & Otto W. Madelung, AS-I Interface The Actuator-Sensor-Interface for Automation (2nd ed. 1999) and discussed in the following patents (all said patents are incorporated by reference in their entirety): U.S. Pat. No. 6,294,889 for a Process and a Control Device for a Motor Output Suitable for being Controlled through a Communication Bus, U.S. Pat. No. 6,378,574 for a Rotary Type Continuous Filling Apparatus, U.S. Pat. No. 6,332,327 for a Distributed Intelligence Control for Commercial Refrigeration, U.S. Pat. No. 6,127,748 for an Installation for Making Electrical Connection Between an Equipment Assembly and a Command and Control System, U.S. Pat. No. 6,173,731 for an Electrofluidic Modular System, U.S. Pat. No. 6,222,441 for a Process and Circuit for Connecting an Actuator to a Line, U.S. Pat. No. 5,978,193 for a Switchgear Unit Capable of Communication and U.S. Pat. No. 5,955,859 for an Interface Module Between a Field Bus and Electrical Equipment Controlling and Protecting an Electric Motor.

The AS-I bus 312 is comprised of two (2) wires, preferably fourteen (14) gauge wires, capable of carrying digital data and power to the various devices. The power to the bus 312 is provided by the control subsystems' power supplies PS1 and PS2 (such power supplies may include StoneL Corporation, Fergus Falls, Minn., Model No. 459002-FM102). The AS-I standard specifies that the power supply generally provide a low voltage twenty-four (24) volts over the bus 312.

The control logic of the control subsystem 300 is a programmable logic controller (PLC) 306. The controller 306 provides the necessary processors to transmit and receive data over the bus 312.

Should the PLC be non-AS-I compliant a gateway 304 provides the necessary interface for the control subsystem 300 to transmit and receive digital data and power over the bus 312. A display 302 generally provides status information of the water treatment system. In addition, a man machine interface 370 provides the necessary interface for a user to initiate various control and monitoring functions of the devices, such as initiating a backwash process. For security, the control subsystem 300 may include hardware (such as a key lock) or software (password) to prevent unauthorized personnel from using the system.

The AS-I standard generally specifies a master/slave bus configuration. The control subsystem (master) and the devices (slave) are designed to operate on an AS-I bus 312. For example, a device may be a valve, such as the INFLUENT valve 314. The INFLUENT valve includes a valve, an actuator and an AS-I interface (such interface includes StoneL Corporation of Fergus Falls, Minn., Model No. QZP96C2R-FM105) (the valve combination will be discussed in detail below). The INFLUENT VALVE 314 is coupled to the AS-I bus 312 via a switch 356. The switch may be a switch such as a StoneL Corporation of Fergus Falls, Minn., Model No. 461002 or Stonel Model No. 461034. The switches generally provide the interface between the bus and the slave devices. In addition, the Model 461034 switch provides a disconnect switch offering a convenient method to remove, replace or repair a slave device while the remainder of the bus devices remain on line.

Figure 4:
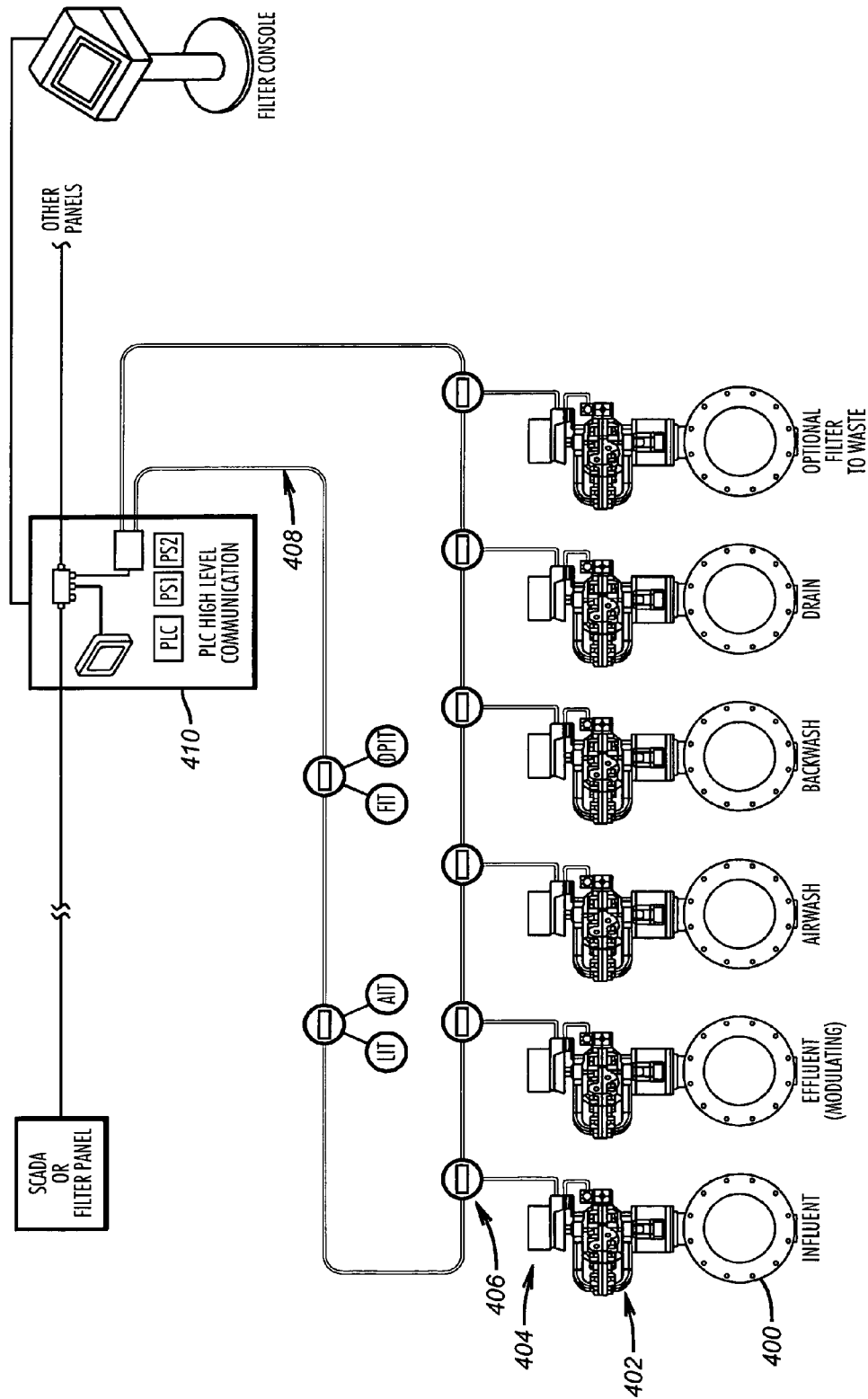
FIG. 4 is a system diagram with combination actuator-valve-interfaces, according to the present invention.

FIG. 4 is a block diagram of a water filter system with a combination interface, actuator and valve assembly, according to the present invention. For example, during normal operations of the water treatment system, an INFLUENT valve 400 is opened. An actuator 402 is coupled to the valve 400 and an AS-I interface 404. The AS-I interface 404 is coupled to an AS-I bus 408 via a switch 406. An exemplary AS-I interface is a StoneL Corporation of Fergus Falls, Minn., Model No. QZP96C2R-FM105. The actuator can be of any type, including a vane-type actuator (such as a K-Tork International, Inc. of Dallas, Tex., vane-type actuator). The state of the valve 400 can be ascertained by the AS-I interface 404. The AS-I interface 404 may include positioning sensors to ascertain the state (e.g. the position of a disc of a butterfly type valve) of the valve 400. In addition, the AS-I interface 404 includes processing capabilities to communicate digital data and provide power from a bus 408.

Referring to FIG. 3, each AS-I Interface includes a processor (not shown) for sending and receiving data from the bus 312. The AS-I interfaces are configured in a serial fashion on the bus 312 and each interface (i.e., each slave) has its own identification number. Furthermore, the AS-I interfaces also provide power from the bus 312 to energize/de-energize the solenoids of the actuators of the various valves. Consequently, should the filter system operate in the normal mode (i.e., pre-treated water flowing through the filter bed and out of the system), the control subsystem 300 would provide the necessary power and command to open the INFLUENT valve 314 and the EFFLUENT valve 336, while closing the DRAIN VALVE 316, the BACKWASH valve 324, the AIRWASH valve 328 and the FILTER TO WASTE valve 330. In addition, should it be necessary to enter a backwash process, the control subsystem 300 would provide the necessary power and command to the appropriate valves to perform such process (as previously described). Furthermore, the various sensors 322, 332 and 360 are also coupled to the AS-I bus 312 via AS-I interfaces 358, 346 and 350, respectively. Thus, operating parameters of the water treatment system may be monitored by the control subsystem 300 via the AS-I bus 312.

Although the topology of the various AS-I interfaces and devices can be in a number of configurations, such as a linear configuration or a tree configuration, the preferred topology is a loop configuration (as shown in FIG. 3). The loop configuration provides for better fault tolerance. For example, should the bus 312 experience a break 360, power and data and still be carried over the bus 312 in either directions A or B, away from the break.

Furthermore, a test sequence may be initiated by the control subsystem 300 to test the various devices. Upon receipt of a test command, the processor within the AS-I interfaces performs a self-test to determine the status of the device. The results of the self-test are transmitted to the control subsystem 300 via the bus 312.

Next, the control subsystem 300 is capable of interfacing to a Supervisory Control and Data Acquisition (SCADA) system or other control subsystems via a communication link 363. In one embodiment, the communication link 363 is an Institute of Electrical and Electronic Engineer (IEEE) standard 802.3 bus (ETHERNET). Typically, a water treatment plant includes a number of water filter systems. Therefore, from a single location, the SCADA system can monitor and control the various water filter systems from one location via the communication link 363. One skilled in the art could recognize that the various commands from the control subsystem may be manually initiated by a user or be automatically initiated by a software routine.

In a manual mode, a user may initiate a backwash process, e.g., after observing the head loss from the sensor 360. The user may initiate the backwash process by pressing appropriate controls in the man machine interface 370 of the control subsystem 300. Thus, the user may view various operating parameters of the water filter system and then take appropriate actions to successfully perform the backwash process based on system prompts received from the control subsystem 300.

Also, status from the various devices may be monitored by a user or a software routine for further action. For example, the water treatment system may be damaged should one of the valves in the system malfunction. For instance, should valve 400 not close upon a command to close, the valve's AS-I interface 404 could sense the malfunction and trigger an alarm. Since each AS-I device has its own identification device number, the AS-I interface 404 would transmit the alarm status to the control subsystem 410 via the bus 408, whereby the control subsystem 410 would identify the malfunctioned valve.

In addition, the devices and control subsystem of the present invention may be pre-packaged in a kit form. The devices and control subsystem may be pre-tested for installation. Consequently, the kit can be used to retrofit existing and new water treatment systems.

Figure 5:
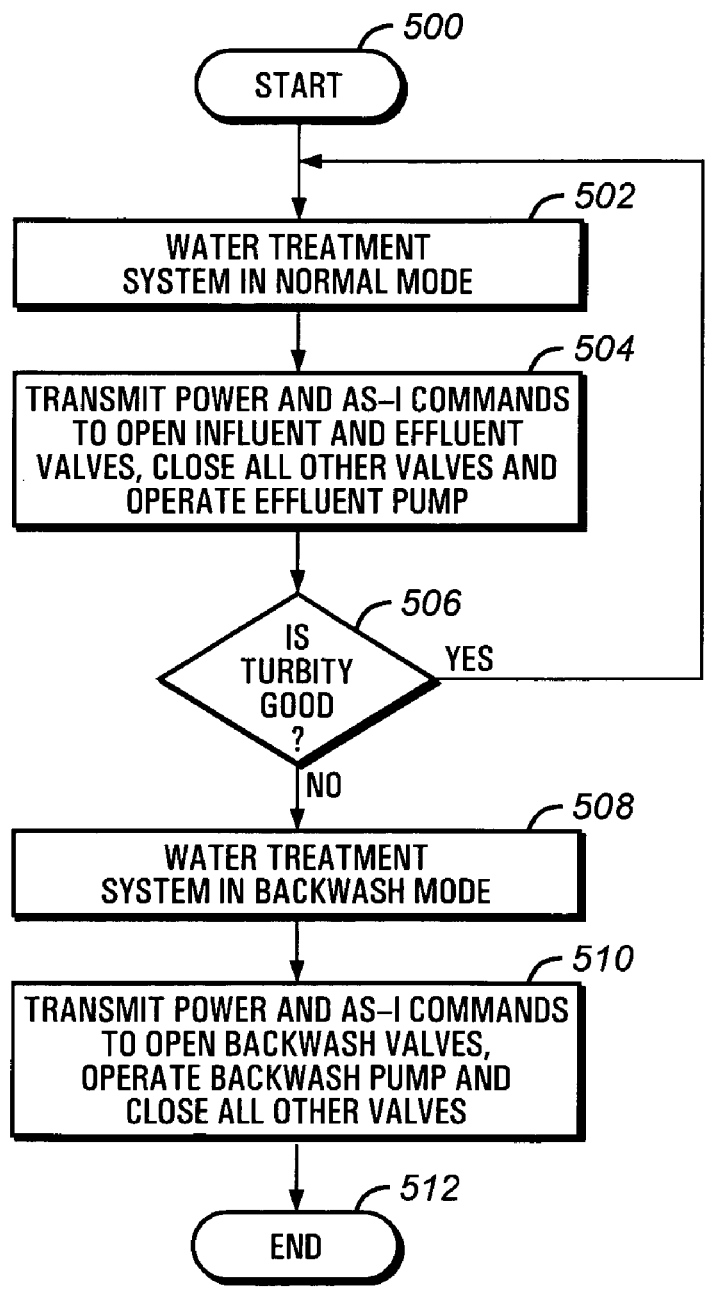
FIG. 5 is a flow chart of an exemplary method of processing water in a water treatment plant according to the present invention.

FIG. 5 is a flow chart of an exemplary method of processing water in a water treatment system, according to the present invention. The method starts at step 500. The water treatment system is operating in a normal mode at step 502. At step 504, a control subsystem transmits power and commands to open an influent and an effluent valves, close all other valves and operate an effluent pump. The commands are typically Actuator Sensor-Interface (AS-I) commands. Next, the turbidity of the water is tested at step 506. If the turbidity is good, the method proceeds to step 502.

At step 506, if the turbidity of the water is not good, the method proceeds to step 508, wherein the system enters a backwash mode. At step 510, the control subsystem transmits power and commands to open a backwash valve, operate a backwash pump and close all other valves. The method ends at step 512.

Figure 6:
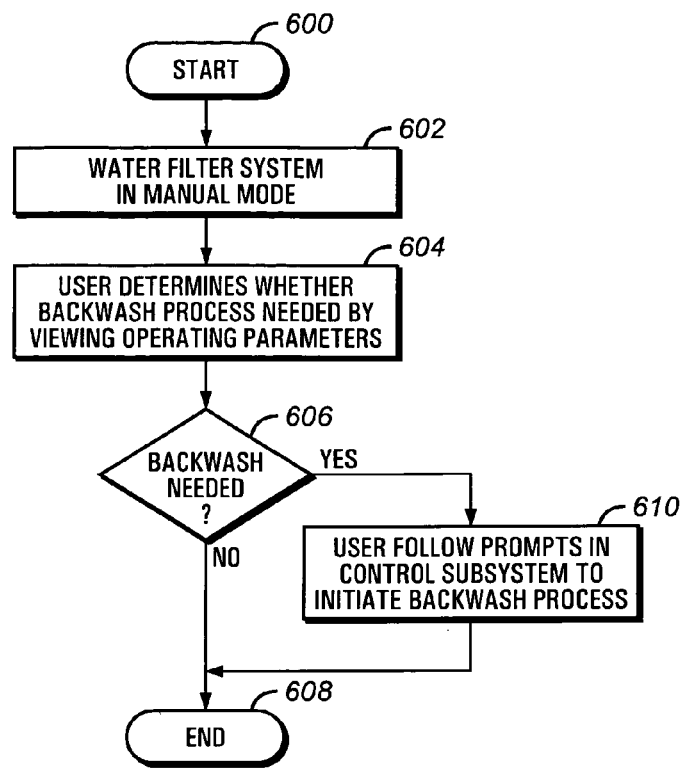
FIG. 6 is a flow chart of an exemplary method of processing water in a water treatment plant according to the present invention.

FIG. 6 is a flow chart of another exemplary method of processing water in a water treatment system, according to the present invention. The method starts at step 600. At step 602, the system is in a manual mode. A user determines whether a backwash process is needed by viewing operating parameters of the system at step 604. The operating parameters could be turbidity, head loss or water flow characteristics. At step 606, the user, after viewing the operating parameters, determines whether a backwash process is needed to clean the system. If a backwash process is not needed, the method ends at step 608. If at step 606, the user determines that a backwash is needed, the method proceeds to step 610. At step 610, the user follows prompts on a display in the control subsystem to initiate and control a backwash process via bus commands. The bus commands could be Actuator Sensor-Interface (AS-I) commands. The method then ends at step 608.

Figure 7:
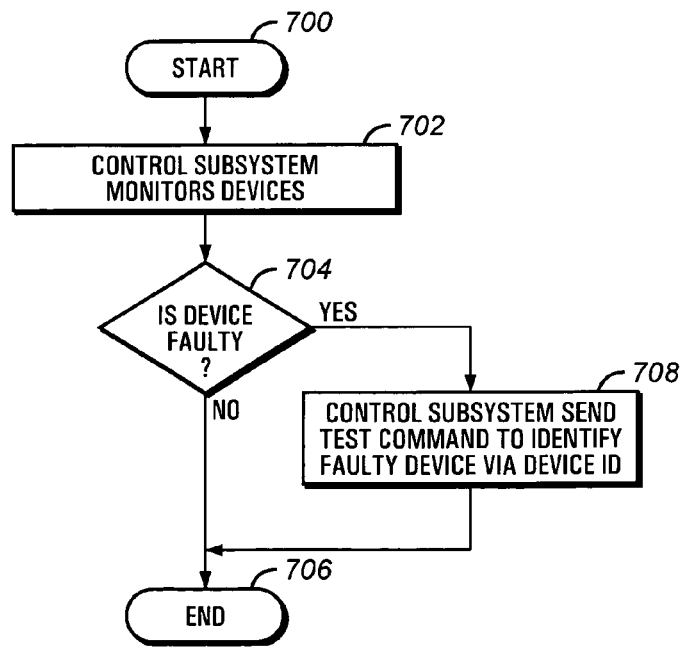
FIG. 7 is a flow chart of an exemplary method of identifying faulty devices in a water treatment plant according to the present invention.

In FIG. 7, a flow chart of an exemplary method of identifying faulty devices in a water treatment system, according to the present invention, is disclosed. The method starts at step 700. A control subsystem monitors the states of devices that are coupled to a bus, at step 702. The devices may include electronic interfaces, actuators, valves and sensors coupled to an Actuator Sensor-Interface (AS-I) bus. The states may be whether a valve is in an open state or a closed state or whether the device is faulty. At step 704, if a device has malfunctioned or is faulty, the control subsystem identifies the device by sending a test command and receiving a response via the bus. The response includes the device's identification number. The response is displayed on a display of the control subsystem. After viewing the display of the control subsystem, a user may then have test personnel examine the faulty device for repair or replacement. Consequently, the method ends at step 706.

The foregoing disclosure and description of the invention are illustrative and explanatory thereof, and various changes in the details of the illustrated apparatus and construction and method of operation may be made without departing from the spirit of the invention. For example, the valves of the system may not necessarily be AS-I compliant valves. Nonetheless, the valves may include AS-I compliant actuators/interface for inclusion of the non-compliant valves on an AS-I complaint bus.

We claim:

1. A water treatment system, comprising:
   a control system;
   a water treatment filter, including;
      a filter bed;
      a plurality of valves coupled to the filter, said valves having sensors that communicate states of the valves; and
      a plurality of actuators coupled to the plurality of valves, said actuators having an electronic interface;
   measurement instrumentation having an electronic interface; and
   a communication bus comprising two wires that couple the control system, the sensors, the electronic interface of the plurality of actuators and the measurement instrumentation, forming a communication network, wherein the control system controls and monitors the plurality of valves via the actuators and sensors, and monitors and tests the measurement instrumentation via the communication bus, and the two wires provide both power and communication to the sensors, actuators, and measurement instrumentation.

2. The system of claim 1, wherein the control system includes programmable control logic and a display.

3. The system of claim 2, wherein the communication bus adheres to an Actuator Sensor-Interface (AS-I) standard.

4. The system of claim 2, wherein the electronic interface of the plurality of actuators adhere to an AS-I standard.

5. The system of claim 2, wherein a human machine interface provides an end user with the ability to change operational parameters for the water treatment system via the human machine interface.

6. The system of claim 1, wherein the communication bus adheres to an Actuator Sensor-Interface (AS-I) standard.

7. The system of claim 6, wherein the communication network is configured in a redundant loop communication network.

8. The system of claim 6, wherein the control system is further coupled to a Supervisory Control and Data Acquisition (SCADA) system via a communication link.

9. The system of claim 8, wherein the communication link is an IEEE 802.3 link.

10. The system of claim 9, wherein the plurality of actuators are vane-type actuators.

11. The system of claim 1, wherein the control system controls and monitors the plurality of actuators via the communication bus.

12. The system of claim 11, wherein the actuator monitoring comprises monitoring the states of the actuators, the actuator states being a normal, malfunction, energized, or de-energized state.

13. The system of claim 1, wherein the wires of the communication bus are unshielded.

14. A method for controlling water flow in a water treatment system, comprising:
   providing measurement instrumentation having an electronic interface configured for digital communications over a communication bus;
   monitoring and testing the measurement instrumentation via the communication bus;
   sending commands to a plurality of valves in the water treatment system via the communication bus, the plurality of valves having a plurality of actuators coupled thereto, the actuators having an electronic interface configured for digital communications over the communication bus, the communication bus comprising two wires that are coupled to the plurality of actuators and the measurement instrumentation, wherein the two wires provide both power and communication to the plurality of actuators and the measurement instrumentation;
   changing states of the plurality of valves via the commands; and
   changing the water flow by changing the states of the plurality of valves.

15. The method of claim 14, wherein the commands and the communication bus adhere to the Actuator Sensor-Interface (AS-I) standard.

16. The method of claim 15, wherein the communication bus is configured in a loop configuration.

17. The method of claim 16, wherein the states of the plurality of valves are an open state or a close state.

18. The method of claim 14, wherein the digital communications include commands to determine whether one of the plurality of valves is faulty.

19. A method of treating water in a water treatment system, comprising:
   providing measurement instrumentation having an electronic interface configured for digital communications over a communication bus;
   monitoring and testing the measurement instrumentation via the communication bus;
   sending commands to a plurality of valves in the water treatment system via the communication bus, the plurality of valves having a plurality of actuators coupled thereto, the actuators having an electronic interface configured for digital communications over the communication bus and the digital communications include commands to determine whether one of the plurality of valves is faulty, the communication bus comprising two wires that are coupled to the plurality of actuators and the measurement instrumentation, wherein the two wires provide both power and communication to the plurality of actuators and the measurement instrumentation, at least one of the plurality of valves allowing water to flow into a filter;
   treating the water; and
   allowing the water to flow into and out of the filter.

20. The method of claim 19, wherein the commands and communication bus adhere to the Actuator Sensor-Interface (AS-I) standard.

21. The method of claim 20, further comprising:
   sending second commands to a second plurality of valves in the water treatment system via a communication bus, said second valves direct water into the filter to wash the filter.

22. A method of testing valves in a water treatment system, comprising:
   providing measurement instrumentation having an electronic interface configured for digital communications over a communication bus;
   sending commands to a plurality of valves in the water treatment system via the communication bus, the plurality of valves having an electronic interface configured for digital communications over the communication bus and the digital communications include commands to determine whether one of the plurality of valves is faulty, the plurality of valves having devices capable of communicating the state of the valve, the communication bus comprising two wires that are coupled to the electronic interface and the measurement instrumentation, wherein the two wires provide both power and communication to the plurality of valves and the measurement instrumentation;

monitoring the operation of the water treatment system via a control system, the control system receiving valve state communication and measurement instrumentation communication via the communication bus;

monitoring and testing the measurement instrumentation via the communication bus;

testing the operation of the plurality of the valves, said testing comprising verifying a proper valve state; and transmitting test results from the plurality of valves.

23. The method of claim 22, wherein the commands and the communication bus adhere to the Actuator Sensor Interface (AS-I) standards.

24. A control system for a water treatment system, the control system comprising:

a programmable logic controller, the programmable logic controller being coupled to a display and a communication bus;

measurement instrumentation having an electronic interface coupled to the communication bus and configured for digital communications over the communication bus; and a plurality of valves having a plurality of actuators coupled thereto, the actuators having an electronic interface configured for digital communications over the communication bus and the digital communications include commands to determine whether one of the plurality of valves is faulty, the communication bus comprising two wires that are coupled to the plurality of actuators and the measurement instrumentation, wherein the two wires provide both power and communication to the plurality of actuators and the measurement instrumentation, wherein the programmable logic controller monitors and tests the measurement instrumentation via the communication bus and controls and monitors the plurality of actuators in the water treatment system.

25. The control system of claim 24, wherein the communication bus is an Actuator Sensor-Interface (AS-I) bus.

26. The control system of claim 24, wherein the actuators are vane-type actuators.

27. The control system of claim 24, wherein the programmable logic controller monitors a plurality of valve sensors, the valve sensors having the ability to communicate the states of the valves via the communication bus.

28. The control system of claim 24 further comprising a communication bus interface that is coupled to the communication bus and to the programmable logic controller.

29. A water filter system for use in a water treatment plant, comprising:

a control subsystem;

a filter;

measurement instrumentation having an electronic interface;

a plurality of valves coupled to the filter for transport of water through the filter, each valve including an actuator and an electronic interface; and a bus extending from the control subsystem to the plurality of valves and the measurement instrumentation, the bus comprising two wires that provide both power and communication to the plurality of valves and the measurement instrumentation, and the control subsystem, the measurement instrumentation, and the plurality of valves being configured for digital communications over the bus, wherein upon installation of the system, the control subsystem monitors and controls the opening and closing of the plurality of valves and monitors and tests the measurement instrumentation via the two wires.

30. The water filter system of claim 29, wherein the control subsystem comprises a programmable logic controller and an interface coupling the bus to the programmable logic controller, wherein monitoring of multiple water filter system operating parameters is facilitated.

31. The water filter system of claim 30, wherein one operating parameter is an alarm indicative of whether at least one of the plurality of valves is in its correct position.

32. The water filter system of claim 30, further comprising piping coupled to the plurality of valves, wherein one operating parameter being monitored is a control parameter indicative of flow capacity produced in the piping.

33. The water filter system of claim 30, wherein one operating parameter being monitored is turbidity of the water.

34. The water filter system of claim 30, wherein one operating parameter being monitored is a water level in the filter.

35. The water filter system of claim 30, wherein the programmable logic controller is operable to communicate digital data regarding the operating parameters to the plurality of valves.

36. The water filter system of claim 29, wherein the plurality of valves further comprises a switch in electronic communications with the control subsystem, the switch being operable to turn the valves off and on in response to commands from the control subsystem.

37. A water filter control kit for use in a water treatment system, comprising:

a control system;

a plurality of actuators and electronic interfaces capable of being coupled to a plurality of valves in the water treatment system; and measurement instrumentation having an electronic interface;

a bus that upon installation of the water filter control kit couples the control system to the plurality of valves and the measurement instrumentation, the bus having two wires that provide both power and communications to the plurality of valves and the measurement instrumentation, and the control system, the measurement instrumentation, and the plurality of valves being configured for digital communications over the bus, wherein upon installation of the kit, the control system monitors and controls the opening and closing of the plurality of valves and monitors and tests the measurement instrumentation via the two wires.

38. The water filter control kit of claim 37, wherein the electronic interfaces and the bus adhere to the Actuator Sensor-Interface (AS-I) standard.

39. The water filter control kit of claim 38, wherein the digital communications include commands to change states of the plurality of valves.

40. The water filter control kit of claim 39, wherein the states of the plurality of valves include an open state, a closed state, or a partially open state.

41. The water filter control kit of claim 38, wherein the actuators are vane-type actuators.

42. The water filter control kit of claim 37, wherein the digital communications include commands to determine whether one of the plurality of valves is faulty.

43. The water filter control kit of claim 37, wherein the control system, actuators and wires have been factory pretested.

44. A method of treating water in a water treatment system, the water treatment system having a water filter control process, comprising:
- providing a menu driven control system for controlling each step of the water filter control process, the menu driven control system comprising programmable control logic within a programmable controller, and a display;
- providing measurement instrumentation having an electronic interface configured for digital communications over a communication bus;
- monitoring and testing the measurement instrumentation via the communication bus;
- sending a command to a control device in the water treatment system via the communication bus, the control device being configured for digital communications over the communication bus and the digital communications include commands to determine whether one of the plurality of valves is faulty, the communication bus comprising two wires that are coupled to the control device, the measurement instrumentation and the menu driven control system, forming a communication network, wherein the two wires provide both power and communication to the control device and the measurement instrumentation, the control device allowing water to flow into a filter;
- treating the water; and
- allowing the water to flow into and out of the filter.

45. The system of claim 44, wherein the communication bus adheres to an Actuator Sensor-Interface (AS-I) standard.

46. The system of claim 45, wherein the control system is further coupled to a Supervisory Control and Data Acquisition (SCADA) system via a communication link.

47. The system of claim 44, wherein the communication network is a loop configured communication network.

48. The system of claim 47, further comprising providing a communication link wherein the communication link is an IEEE 802.3 link.

49. A method of providing a water filter control kit for use in a water treatment system, comprising:
- providing a control system;
- providing measurement instrumentation having an electronic interface;
- providing a plurality of actuators and electronic interfaces that are capable of being coupled to a plurality of valves in the water treatment system; and
- providing a communication bus that upon installation of the water filter control kit couples the control system to the electronic interfaces of the measurement instrumentation and the actuators of the plurality of valves, the communication bus having two wires that provide both power and communication to the measurement instrumentation and the plurality of valves, wherein the control system, measurement instrumentation, and the plurality of valves are configured to digitally communicate over the communication bus, the digital communication includes commands to determine whether one of the plurality of valves is faulty, and the control system controls the opening and closing of the plurality of valves and monitors and tests the measurement instrumentation via the two wires.

50. The method of claim 49 further comprising retrofitting an existing water treatment system by installing said water filter control kit.

51. A method of providing a water filter control kit for use in a water treatment system, comprising:
- providing a control system;
- providing a plurality of actuators and electronic interfaces that are capable of being coupled to a plurality of valves in the water treatment system;
- providing a communication bus that upon installation of the water filter control kit couples the control system to the plurality of valves, the communication bus having two wires that provide both power and communication to the plurality of valves, wherein the control system and the plurality of valves are configured to digitally communicate over the communication bus, the digital communication includes commands to determine whether one of the plurality of valves is faulty, and the control system controls the opening and closing of the plurality of valves via the two wires;
- retrofitting an existing water treatment system by installing said water filter control kit; and
- providing measurement instrumentation, the measurement instrumentation having an electronic interface, the communication bus coupling the control system and the measurement instrumentation's electronic interface, wherein the control system monitors the instrumentation via the communication bus, and the control system is capable of testing said measurement instrumentation via the communication bus to determine its status.

52. The method of claim 51, wherein the communication bus is configured in a loop configuration.

* * * * *